USO10967682B2

(12) United States Patent
Kung

(10) Patent No.: US 10,967,682 B2
(45) Date of Patent: Apr. 6, 2021

(54) TIRE HAVING NOISE-REDUCING TREAD PATTERN

(71) Applicant: Nexen Tire Corporation, Gyeongsangnam-do (KR)

(72) Inventor: Lin E. Kung, Gyeongsangnam-do (KR)

(73) Assignee: Nexen Tire Corporation, Richfield, OH (US)

( * ) Notice: Subject to any disclaimer, the term of this patent is extended or adjusted under 35 U.S.C. 154(b) by 588 days.

(21) Appl. No.: 15/657,620

(22) Filed: Jul. 24, 2017

(65) Prior Publication Data
US 2019/0023078 A1 Jan. 24, 2019

(51) Int. Cl.
*B60C 11/11* (2006.01)
*B60C 11/03* (2006.01)

(52) U.S. Cl.
CPC .......... *B60C 11/0318* (2013.01); *B60C 11/11* (2013.01); *B60C 2200/14* (2013.01)

(58) Field of Classification Search
CPC .................................................. B60C 11/0318
See application file for complete search history.

(56) References Cited

U.S. PATENT DOCUMENTS 6,651,712 B1 * 11/2003 Sundkvist ........... B60C 11/0318
152/209.12
2016/0347122 A1 * 12/2016 Neil ..................... B60C 11/0318

FOREIGN PATENT DOCUMENTS

EP 0541004 A1 * 5/1993 ......... B60C 11/0318

OTHER PUBLICATIONS

Machine Translation: EP-0541004-A1; Kleinhoff Klaus; (Year: 2020).*

* cited by examiner

*Primary Examiner* — Kendra Ly
(74) *Attorney, Agent, or Firm* — Gutwein Law; Greg N. Geiser

(57) ABSTRACT

A tire includes a tire carcass, and a tread extending circumferentially about the tire carcass and including a noise-reducing tread pattern. The noise-reducing tread pattern includes a plurality of tread elements, with the tread elements having a first pitch length (1), a second pitch length (2), or a third pitch length (3). The noise-reducing tread pattern includes one of the following circumferential configurations: a circumferential row including 40 pitches, with 13 occurrences of "1," 13 occurrences of "2," and 14 occurrences of "3;" a circumferential row including 38 pitches, with 10 occurrences of "1," 19 occurrences of "2," and 9 occurrences of "3;" a circumferential row including 42 pitches, with 10 occurrences of "1," 19 occurrences of "2," and 13 occurrences of "3;" and a circumferential row including 44 pitches, with 11 occurrences of "1," 20 occurrences of "2," and 13 occurrences of "3."

8 Claims, 4 Drawing Sheets

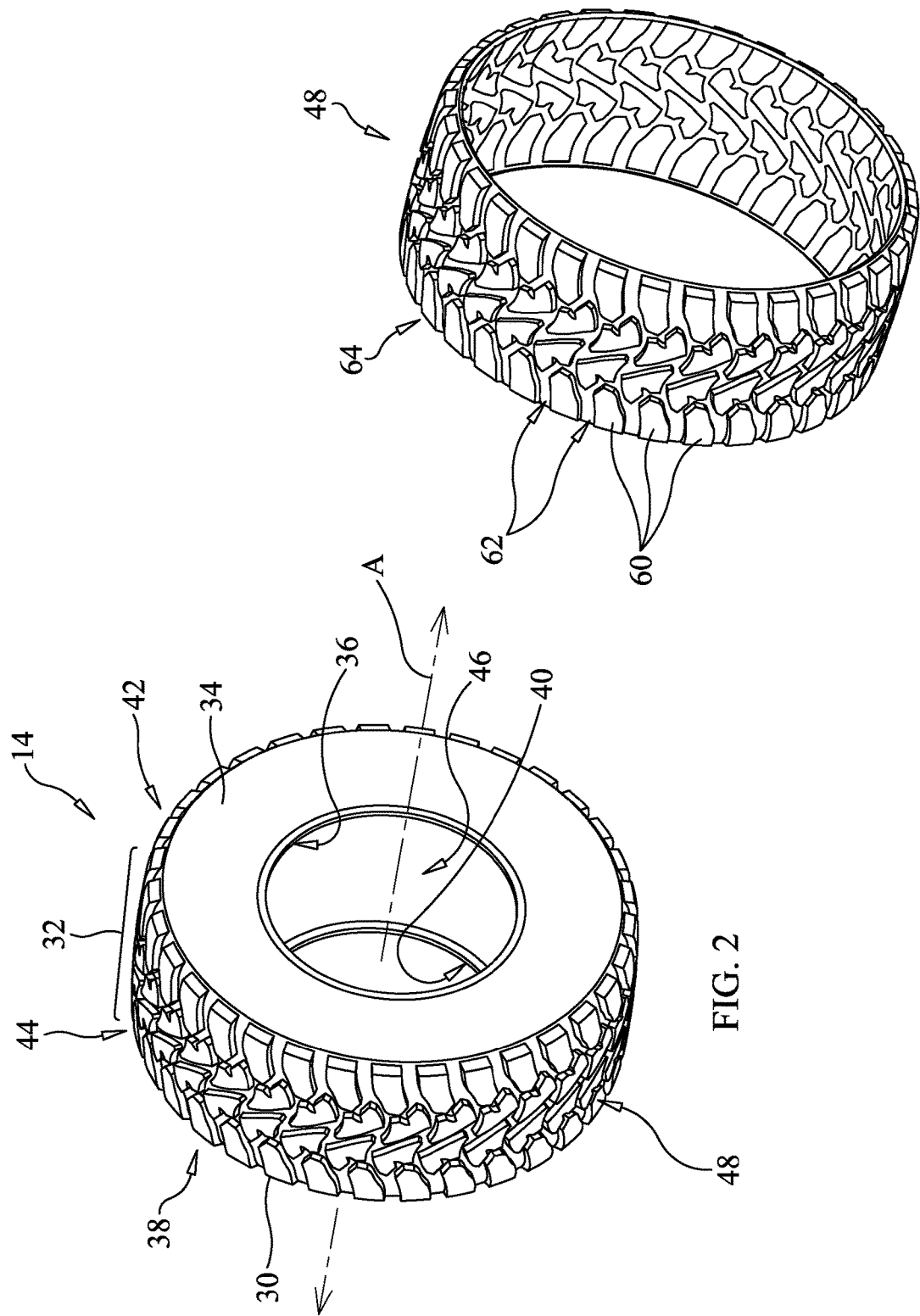

US 10,967,682 B2

TIRE HAVING NOISE-REDUCING TREAD PATTERN

TECHNICAL FIELD

The present disclosure relates generally to a noise-reducing tread pattern including a plurality of tread elements and, more particularly, to tread elements having one of three different pitches, which are configured circumferentially according to a particular pitch sequence.

BACKGROUND

The mud terrain market is understood in the industry to apply to vehicles or machines where aggressive off-road usage is common or where usage in mud, rock, sand, and/or gravel predominates. Due to these aggressive applications, the tread elements of off-road tires are generally much larger to allow for improved survivability in conditions which are harsher than those experienced by passenger vehicles or other on-road vehicles. However, when vehicles with mud terrain tires are applied to on-road usage, these open and larger type tread elements may have a generally objectionable noise level as the tire contacts the road pavement at various speeds and vehicle loads.

U.S. Pat. No. 9,327,558 to Stuckey et al. is agricultural related and directed to a tire including a tread extending circumferentially about a tire carcass. The tread includes a plurality of tread elements disposed in a tread pattern. The tread elements have one of two different pitch lengths and are disposed in a noise-reducing pitch sequence.

As should be appreciated, there is a continuing need to improve performance, quality, reliability, and satisfaction of mud terrain tires. The present disclosure is directed to such an endeavor.

SUMMARY OF THE INVENTION

In one aspect, a tire includes a tire carcass, and a tread extending circumferentially about the tire carcass and including a noise-reducing tread pattern. The noise-reducing tread pattern includes a plurality of tread elements, with the tread elements having a first pitch length (1), a second pitch length (2), or a third pitch length (3). The noise-reducing tread pattern includes one of the following circumferential configurations: a circumferential row including 40 pitches, with 13 occurrences of "1," 13 occurrences of "2," and 14 occurrences of "3;" a circumferential row including 38 pitches, with 10 occurrences of "1," 19 occurrences of "2," and 9 occurrences of "3;" a circumferential row including 42 pitches, with 10 occurrences of "1," 19 occurrences of "2," and 13 occurrences of "3;" and a circumferential row including 44 pitches, with 11 occurrences of "1," 20 occurrences of "2," and 13 occurrences of "3."

In another aspect, an off-road vehicle includes a frame, and a set of tires mounted on the frame and having a noise-reducing tread pattern. The noise-reducing tread pattern may include a plurality of tread elements, with the tread elements having a first pitch length, a second pitch length, or a third pitch length. The noise-reducing tread pattern includes one of the following circumferential configurations: a circumferential row including 40 pitches, with 13 occurrences of "1," 13 occurrences of "2," and 14 occurrences of "3;" a circumferential row including 38 pitches, with 10 occurrences of "1," 19 occurrences of "2," and 9 occurrences of "3;" a circumferential row including 42 pitches, with 10 occurrences of "1," 19 occurrences of "2," and 13 occurrences of "3;" and a circumferential row including 44 pitches, with 11 occurrences of "1," 20 occurrences of "2," and 13 occurrences of "3."

In yet another aspect, a method of manufacturing a mud terrain tire having a noise-reducing tread pattern is provided. The method includes forming a tread configured to extend circumferentially about a tire carcass, with the tread including the noise-reducing tread pattern. The noise-reducing tread pattern includes a plurality of tread elements, with the tread elements having a first pitch length (1), a second pitch length (2), or a third pitch length (3). The noise-reducing tread pattern includes one of the following circumferential configurations: a circumferential row including 40 pitches, with 13 occurrences of "1," 13 occurrences of "2," and 14 occurrences of "3;" a circumferential row including 38 pitches, with 10 occurrences of "1," 19 occurrences of "2," and 9 occurrences of "3;" a circumferential row including 42 pitches, with 10 occurrences of "1," 19 occurrences of "2," and 13 occurrences of "3;" and a circumferential row including 44 pitches, with 11 occurrences of "1," 20 occurrences of "2," and 13 occurrences of "3."

Other features and aspects will be apparent from the following description and accompanying drawings.

BRIEF DESCRIPTION OF THE DRAWINGS

FIG. 2 is a perspective view of a tire of the vehicle of FIG. 1, having a noise-reducing tread pattern in accordance with the present disclosure;

FIG. 3 is a perspective view of the tread portion of the tire of FIG. 2;

DETAILED DESCRIPTION

Figure 1:
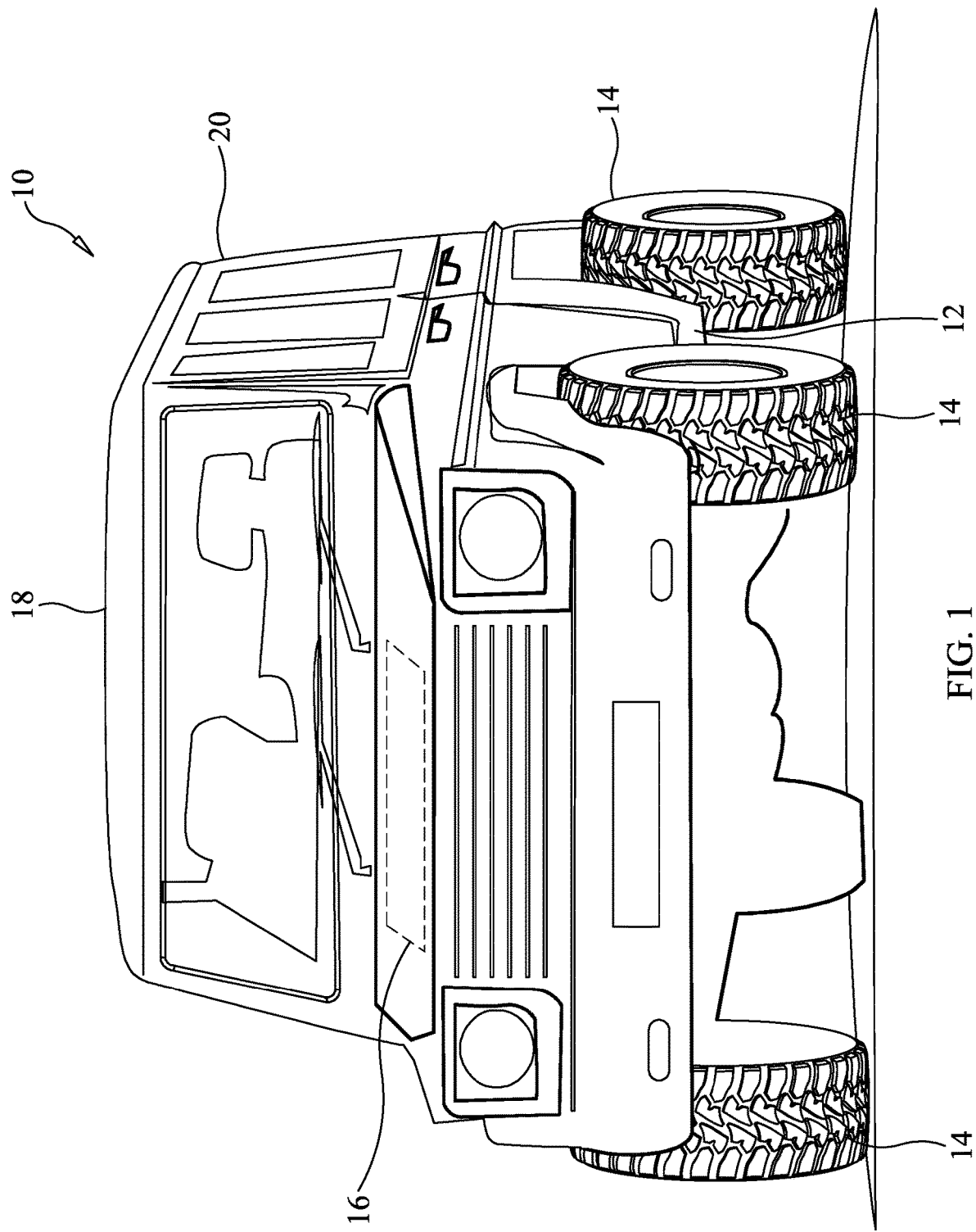
FIG. 1 is a side diagrammatic view of an off-road vehicle, according to an exemplary embodiment of the present disclosure.

Reference will now be made in detail to specific embodiments or features, examples of which are illustrated in the accompanying drawings. Wherever possible, corresponding or similar reference numerals will be used throughout the disclosure and accompanying drawings to refer to the same or corresponding parts.

An exemplary off-road vehicle 10 according to the present disclosure is shown generally in FIG. 1. The off-road vehicle 10 may be any type of vehicle capable of driving on and off paved or gravel surfaces, for example. It is generally characterized by having large tires with deep, open treads. Generally speaking, the off-road vehicle 10 includes a frame 12 supporting a set of tires 14, which are mounted on the frame 12. The tires 14 are configured to transfer the load of the off-road vehicle 10 to the ground through the tires 14, which may be mud terrain tires, or other similar off-road tires. The frame 12 may also support an engine 16, an operator compartment or cab 18, and a body 20, along with various other systems and/or components.

Turning now to FIG. 2, an exemplary tire 14 of the present disclosure will be discussed in greater detail. The tire 14 may be a pneumatic tire, for example, and may have any of a variety of different configurations and/or constructions. As shown in the exemplary embodiment, the tire 14 may include a carcass, or body, 30, having an axis of rotation A. The carcass 30, or tire 14, may generally include a crown 32, which may represent a center tread area of the tire 14 and may extend circumferentially about the carcass 30. A first sidewall 34 may include a vertical portion of the tire 14 extending radially inwardly from the crown 32 to a first bead 36. On the opposite side of the tire 14, a second sidewall 38 may be vertically oriented and may extend radially inwardly from the crown 32 to a second bead 40. First and second shoulders 42, 44 may include the areas where the crown 32 meets the respective one of the first and second sidewalls 34, 38. The first and second beads 36, 40 may secure the tire 14 in place on a rim or wheel (not shown).

The crown 32, along with the first and second sidewalls 34, 38, may define a tire chamber 46 suitable for containing a quantity of pressurized air in a conventional manner, such as, for example, by mounting the first and second beads 36, 40 in a substantially fluid-tight manner on a rim or wheel. It should be appreciated that the tire carcass 30 may be of any suitable construction and may be made from any suitable materials. Examples of materials may include synthetic rubber, natural rubber, fabric and wire, along with carbon black and other chemical compounds.

Tread 48, which may be formed about the tire carcass 30 and may extend circumferentially about the axis A of the tire carcass 30, is shown removed from the rest of the tire 14 in FIG. 3. The tread 48 may include a plurality of tread elements, or lugs, 60, and voids, or spaces, 62 between the tread elements 60. As shown, the tread elements 60 may project outwardly from the tire 14, with the voids 62 being recessed relative to the tread elements 60. Tread elements 60 of a mud terrain tire, such as tire 14, are typically larger than those of an on-road tire. Both the tread elements 60 and the voids 62 may have any of a variety of different shapes, sizes, and/or configurations, with an arrangement of the tread elements 60 and the voids 62 forming a tread pattern 64 around the tire 14.

Figure 4:
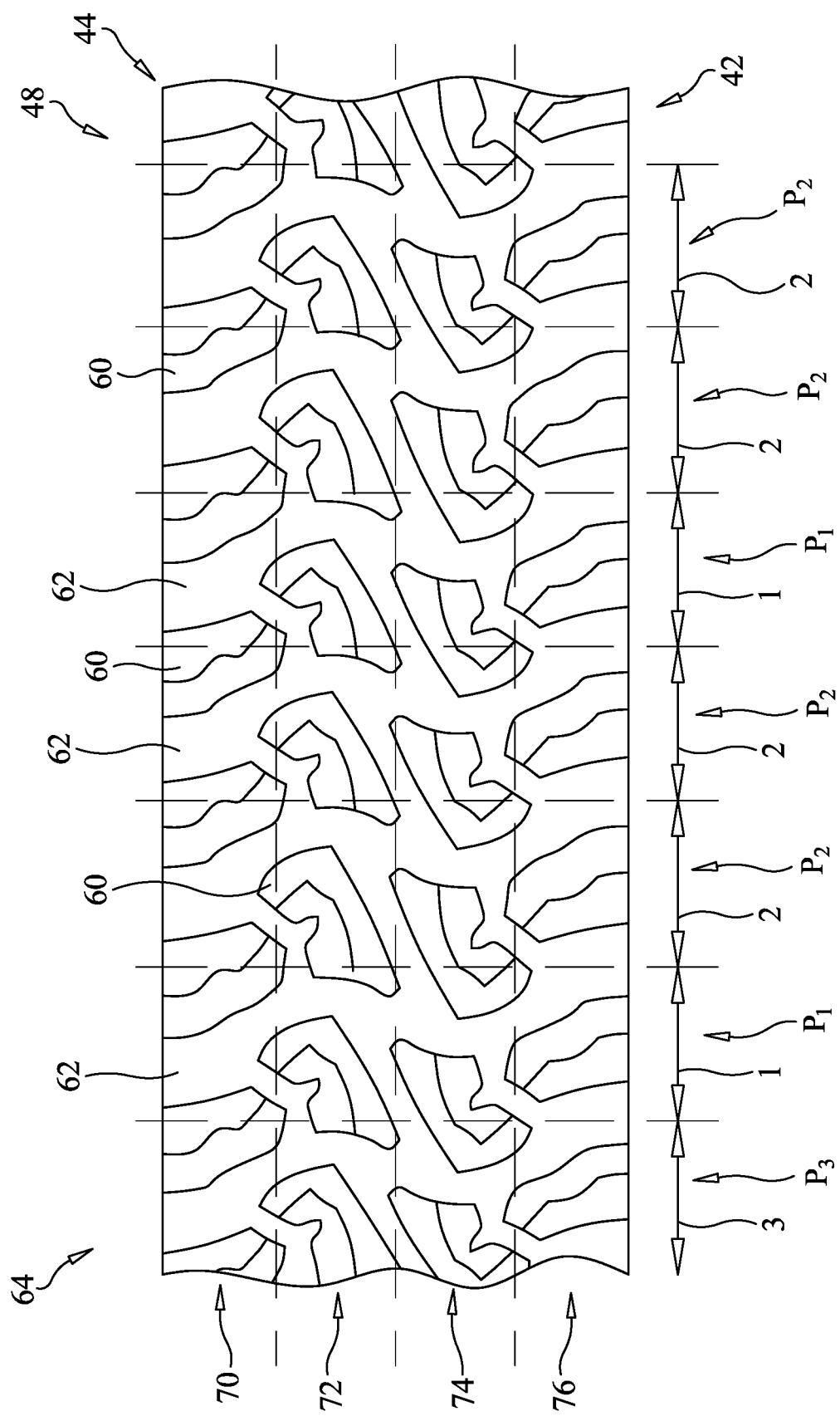
FIG. 4 is a flattened tread section illustrating a portion of an exemplary noise-reducing tread pattern, according to the present disclosure.
Figure 5:
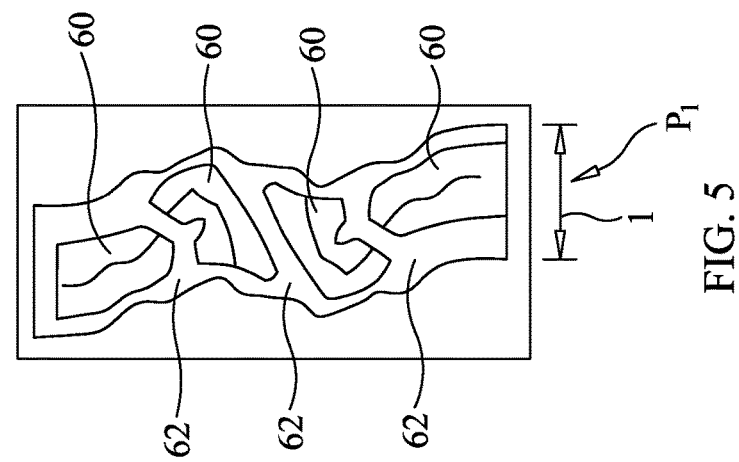
FIG. 5 is a flattened tread section of a single pitch of the noise-reducing tread pattern of FIG. 4, according to the present disclosure.

Turning now to FIG. 4, the tread pattern 64, which, as taught herein, is a noise-reducing tread pattern, 64, will be discussed in greater detail. The noise-reducing tread pattern 64 may be applicable to mud terrain type tread and other off-road tread. The tread pattern 64 may include one or more circumferentially extending rows 70, 72, 74, 76 of tread elements 60 that form a loop pattern of tread elements 60 around the exterior of the tire 14. In addition, the tread 48 may be divided into a predetermined number of pitches $P_1$, $P_2$, $P_3$ of varying pitch lengths 1, 2, 3. Each of the pitches $P_1$, $P_2$, $P_3$ includes a tread element 60 and an adjacent void 62, as shown, and the pitch length 1, 2, 3 is a circumferential length or measure of each pitch $P_1$, $P_2$, $P_3$. Each of the pitches $P_1$, $P_2$, $P_3$ spans between shoulders 42, 44 of the tire 14, and each pitch $P_1$, $P_2$, $P_3$ has a circumferential length corresponding to one of the pitch lengths 1, 2, 3. A single exemplary pitch $P_1$ having pitch length 1 is shown in FIG. 5.

According to the exemplary embodiment, the tread 48 may be divided into 40 pitches $P_1$, $P_2$, $P_3$ having three different pitch lengths 1, 2, 3. Stated another way, the tread elements 60, and surrounding voids 62, which make up the pitches $P_1$, $P_2$, $P_3$, may have a first pitch length 1, a second pitch length 2, or a third pitch length 3 around the tire 14. Further, the first pitch length 1, the second pitch length 2, and the third pitch length 3 may have a pitch ratio within a range of between about 0.85 to 1.15. For example, the first pitch length 1 may be approximately 85% of the second pitch length 2, which may be defined as 100%, and the third pitch length 3 may be defined as 115% of the second pitch length 2.

The tread elements 60 having the first pitch length 1 may be substantially identical, the tread elements 60 having the second pitch length 2 may be substantially identical, and the tread elements 60 having the third pitch length 3 may be substantially identical.

The noise-reducing tread pattern 64 of the present disclosure may include the circumferential arrangement of the pitches $P_1$, $P_2$, $P_3$ according to particular pitch sequences. That is, as described below, the tread pattern 64 may include the pitches $P_1$, $P_2$, $P_3$ arranged about the tire 14 such that a specific predetermined sequence is followed. Four exemplary circumferential configurations are provided below:

a) a circumferential row including 40 pitches, with 13 occurrences of the first pitch length, 13 occurrences of the second pitch length, and 14 occurrences of the third pitch length; wherein the circumferential row including 40 pitches, with 13 occurrences of the first pitch length (1), 13 occurrences of the second pitch length (2), and 14 occurrences of the third pitch length (3), includes the following pitch sequence:

1211223333321112123233321233221112112333;

b) a circumferential row including 38 pitches, with 10 occurrences of the first pitch length, 19 occurrences of the second pitch length, and 9 occurrences of the third pitch length; wherein the circumferential row including 38 pitches, with 10 occurrences of the first pitch length (1), 19 occurrences of the second pitch length (2), and 9 occurrences of the third pitch length (3), includes the following pitch sequence:

12321223223323211112322332222212111232;

c) a circumferential row including 42 pitches, with 10 occurrences of the first pitch length, 19 occurrences of the second pitch length, and 13 occurrences of the third pitch length; and wherein the circumferential row including 42 pitches, with 10 occurrences of the first pitch length (1), 19 occurrences of the second pitch length (2), and 13 occurrences of the third pitch length (3), includes the following pitch sequence:

232122233221121232333332222233322112321111.

d) a circumferential row including 44 pitches, with 11 occurrences of the first pitch length, 20 occurrences of the second pitch length, and 13 occurrences of the third pitch length; wherein the circumferential row including 44 pitches, with 11 occurrences of the first pitch length (1), 20 occurrences of the second pitch length (2), and 13 occurrences of the third pitch length (3), includes the following pitch sequence:

33321122321223333222121123332322322111222121.

Figure 6:
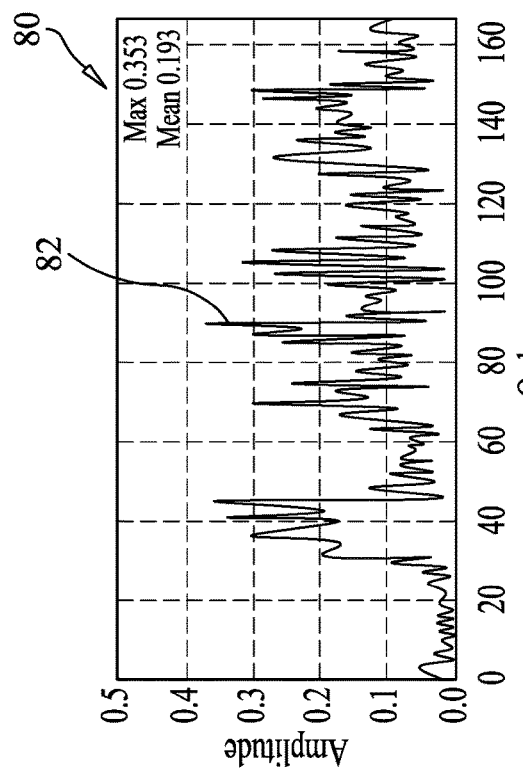
FIG. 6 is a graphical representation of a harmonic spectrum analyzing an exemplary tire having a noise-reducing tread pattern according to the present disclosure.
Figure 7:
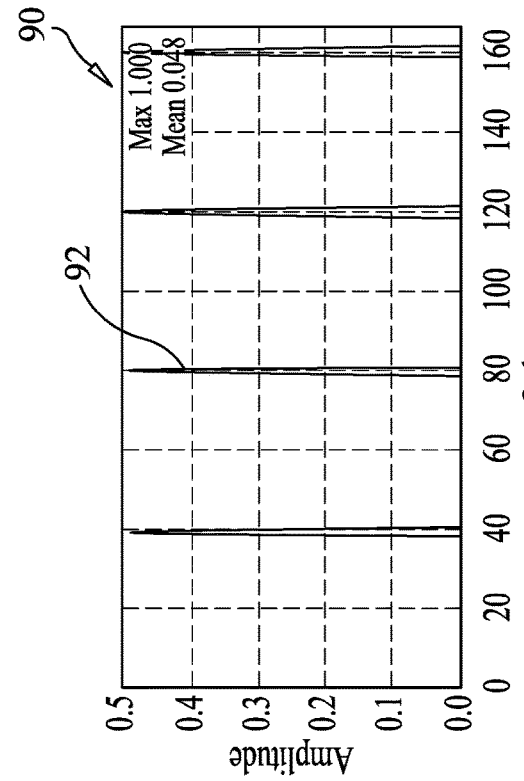
FIG. 7 is a graphical representation of a harmonic spectrum analyzing an exemplary mono pitch tire.

The pitches $P_1$, $P_2$, $P_3$, configured as described above and positioned about the tire 14 according to one of the pitch sequences disclosed herein, may result in reduced noise levels generated by the tread pattern 64 as a result of pavement contact. FIG. 6 includes a graphical representation 80 of a harmonic spectrum 82 analyzing an exemplary tire, such as tire 14, having the noise-reducing tread pattern 64 according to the present disclosure. The harmonic spectrum 82 may be generated from a computer-based simulation of one of the above pitch sequences. For comparison, FIG. 7 is a graphical representation 90 of a harmonic spectrum 92 analyzing an exemplary mono pitch tire. As shown, the amplitude level corresponding to the noise-reducing tread pattern 64 in FIG. 6 may be significantly reduced versus that corresponding to the mono pitch tire in FIG. 7.

INDUSTRIAL APPLICABILITY

The present disclosure relates generally to tires. More particularly, the present disclosure is directed to mud terrain tires and/or other off-road tires. Further, the present disclosure is directed to treads and tread patterns on tires, and reducing noise, or pattern noise, generated as a result of contact of the tire tread on pavement.

The mud terrain market applies to vehicles or machines where aggressive off-road usage is common. Due to the aggressive application, the tread elements are generally much larger to allow for improved survivability in conditions which are harsher than those experienced by typical on-road vehicles. However, when vehicles with mud terrain tires are applied to on-road usage, these open and larger type tread elements may have a generally objectionable noise level as the tire contacts the road pavement at various speeds and vehicle loads.

Referring generally to FIGS. 1-7, an exemplary tire 14 of the present disclosure may include a carcass 30 having an axis of rotation A. The carcass 30 may generally include a crown 32 extending circumferentially about the carcass 30, a first sidewall 34 extending radially inwardly from the crown 32 to a first bead 36, and a second sidewall 38 extending radially inwardly from the crown 32 to a second bead 40. First and second shoulders 42, 44 may include areas where the crown 32 meets the respective one of the first and second sidewalls 34, 38. The first and second beads 36, 40 may secure the tire 14 in place on a rim or wheel.

Tread 48 may extend circumferentially about the axis A of the tire carcass 30, and may include a plurality of tread elements 60 and voids 62 between the tread elements 60. An arrangement of the tread elements 60 and the voids 62 may form a tread pattern 64, also referred to as a noise-reducing tread pattern, around the tire 14. The noise-reducing tread pattern 64 may be applicable to mud terrain type tread and other off-road tread. The tread pattern 64 may be divided into a predetermined number of pitches $P_1$, $P_2$, $P_3$, which may span laterally between shoulders 42, 44 and may have one of three pitch lengths 1, 2, 3. The pitch lengths 1, 2, 3 may be measured circumferentially about the tire 14.

That is, according to the exemplary embodiment, the noise-reducing tread pattern 64 may include a plurality of tread elements 60, with the tread elements 60 having the first pitch length 1, the second pitch length 2, or the third pitch length 3. Further, the first pitch length 1, the second pitch length 2, and the third pitch length 3 may have a pitch ratio within a range of between about 0.85 to 1.15. For example, the first pitch length 1 may be approximately 85% of the second pitch length 2, which may be defined as 100%, and the third pitch length 3 may be defined as 115% of the second pitch length 2.

The noise-reducing tread pattern 64 of the present disclosure may include the circumferential arrangement of the pitches $P_1$, $P_2$, $P_3$ according to particular pitch sequences. That is, the tread pattern 64 may include the pitches $P_1$, $P_2$, $P_3$ arranged about the tire 14 such that a specific predetermined sequence of pitch lengths 1, 2, 3 is followed. Four exemplary circumferential configurations are provided below:

a) a circumferential row including 40 pitches, with 13 occurrences of the first pitch length, 13 occurrences of the second pitch length, and 14 occurrences of the third pitch length; wherein the circumferential row including 40 pitches, with 13 occurrences of the first pitch length (1), 13 occurrences of the second pitch length (2), and 14 occurrences of the third pitch length (3), includes the following pitch sequence:
1211223333321112123233321233221112112333;

b) a circumferential row including 38 pitches, with 10 occurrences of the first pitch length, 19 occurrences of the second pitch length, and 9 occurrences of the third pitch length; wherein the circumferential row including 38 pitches, with 10 occurrences of the first pitch length (1), 19 occurrences of the second pitch length (2), and 9 occurrences of the third pitch length (3), includes the following pitch sequence:
12321223223323211112322332222212111232;

c) a circumferential row including 42 pitches, with 10 occurrences of the first pitch length, 19 occurrences of the second pitch length, and 13 occurrences of the third pitch length; and wherein the circumferential row including 42 pitches, with 10 occurrences of the first pitch length (1), 19 occurrences of the second pitch length (2), and 13 occurrences of the third pitch length (3), includes the following pitch sequence:
232122233221121232333332222233322112321111.

d) a circumferential row including 44 pitches, with 11 occurrences of the first pitch length, 20 occurrences of the second pitch length, and 13 occurrences of the third pitch length; wherein the circumferential row including 44 pitches, with 11 occurrences of the first pitch length (1), 20 occurrences of the second pitch length (2), and 13 occurrences of the third pitch length (3), includes the following pitch sequence:
33321122321223333222121123332322211122121.

The arrangement of the tread elements 60 circumferentially around the tire 14 can have a moderating effect on the pattern noise. That is, pattern noise may be minimized by aligning the tread elements 60 in the sequences described herein and within the pitch ratio described herein. The result is lower noise output as a result of pavement contact when compared to other mud terrain or off-road tires.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed:
1. A tire having a noise-reducing tread pattern, including:
a tire carcass having an axis of rotation; and
a tread extending circumferentially about the tire carcass around the axis of rotation and including the noise-reducing tread pattern;
wherein the noise-reducing tread pattern includes a plurality of tread elements, with the tread elements each having a first pitch length, a second pitch length, or a third pitch length, wherein the first pitch length is less than the second pitch length which is less than the third pitch length; and
wherein the noise-reducing tread pattern includes the following circumferential configuration:
a circumferential row including 44 pitches, with 11 occurrences of the first pitch length (1), 20 occurrences of the second pitch length (2), and 13 occurrences of the third pitch length (3) including the following pitch sequence:
33321122321223333222121123332322211122-121.

2. The tire of claim 1, wherein the first pitch length, the second pitch length, and the third pitch length have a pitch ratio within a range of between about 0.85 to 1.15.

3. The tire of claim 1, wherein the tread elements having the first pitch length are substantially identical, the tread elements having the second pitch length are substantially identical, and the tread elements having the third pitch length are substantially identical.

4. The tire of claim 1, wherein the tread is a mud terrain type tread.

5. An off-road vehicle, including:
a frame; and
a set of tires mounted on the frame and having a noise-reducing tread pattern;
wherein the noise-reducing tread pattern includes a plurality of tread elements, with the tread elements each having a first pitch length, a second pitch length, or a third pitch length, wherein the first pitch length is less than the second pitch length which is less than the third pitch length; and
wherein the noise-reducing tread pattern includes the following circumferential configuration:
a circumferential row including 44 pitches, with 11 occurrences of the first pitch length (1), 20 occurrences of the second pitch length (2), and 13 occurrences of the third pitch length (3) including the following pitch sequence: 33321122321223333222121123332322322111222-121.

6. The off-road vehicle of claim 5, wherein the first pitch length, the second pitch length, and the third pitch length have a pitch ratio within a range of between about 0.85 to 1.15.

7. The off-road vehicle of claim 6, wherein the tread elements having the first pitch length are substantially identical, the tread elements having the second pitch length are substantially identical, and the tread elements having the third pitch length are substantially identical.

8. A method of manufacturing a mud terrain tire having a noise-reducing tread pattern, the method including steps of:
forming a tread configured to extend circumferentially about a tire carcass and including the noise-reducing tread patterns;
wherein the noise-reducing tread pattern includes a plurality of tread elements, with the tread elements each having a first pitch length, a second pitch length, or a third pitch length, wherein the first pitch length is less than the second pitch length which is less than the third pitch length; and
wherein the noise-reducing tread pattern includes the following circumferential configuration:
a circumferential row including 44 pitches, with 11 occurrences of the first pitch length (1), 20 occurrences of the second pitch length (2), and 13 occurrences of the third pitch length (3) including the following pitch sequence: 33321122321223333222121123332322322111222121.

* * * * *